US012639690B2

(12) United States Patent  
Takeno et al.

(10) Patent No.: US 12,639,690 B2  
(45) Date of Patent: May 26, 2026

(54) CHECKOUT APPARATUS, MONITORING APPARATUS, AND MONITORING METHOD

(71) Applicant: Toshiba Tec Kabushiki Kaisha, Tokyo (JP)

(72) Inventors: Yuishi Takeno, Numazu Shizuoka (JP); Keita Yamazaki, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/603,129

(22) Filed: Mar. 12, 2024

(65) Prior Publication Data

US 2024/0220956 A1 Jul. 4, 2024

Related U.S. Application Data

(63) Continuation of application No. 17/461,430, filed on Aug. 30, 2021, now abandoned.

(30) Foreign Application Priority Data

Dec. 8, 2020 (JP) ................................. 2020-203454

(51) Int. Cl.
*G06Q 20/20* (2012.01)
*G06K 7/14* (2006.01)
(Continued)

(52) U.S. Cl.
CPC ......... *G06Q 20/206* (2013.01); *G06K 7/1413* (2013.01); *G06Q 20/208* (2013.01);
(Continued)

(58) Field of Classification Search
CPC .. G06Q 20/206; G06Q 20/208; G07G 1/0036; G07G 3/00; H04N 7/18; G06K 7/1413; G06V 20/52; G06V 40/10
(Continued)

(56) References Cited

U.S. PATENT DOCUMENTS

| | | | |
|---|---|---|---|
| 7,209,891 B1 | 4/2007 | Addy et al. | |
| 2017/0286939 A1* | 10/2017 | Okamura | ............... G07G 3/003 |

(Continued)

FOREIGN PATENT DOCUMENTS

| | | |
|---|---|---|
| JP | 2013-140629 A | 7/2013 |
| JP | 6115034 B2 * | 4/2017 |

(Continued)

OTHER PUBLICATIONS

Notice of Reasons for Refusal mailed Mar. 5, 2024 in corresponding Japanese Patent Application No. 2020-203454, 6 pages (with Translation).

(Continued)

*Primary Examiner* — Ariel J Yu
*Assistant Examiner* — Denisse Y Ortiz Roman
(74) *Attorney, Agent, or Firm* — Kim & Stewart LLP

(57) ABSTRACT

According to one embodiment, a checkout apparatus includes a camera interface and a processor. The camera interface acquires an image from a camera positioned to image a work region of the checkout apparatus and its surroundings in which a person performs a registration of items in a sales transaction and settlement of the sales transaction. The processor performs a registration process for registering items in the sales transaction and also a payment process for settlement of the sales transaction based on the items registered in the registration process. The processor detects whether a person has left the work region based on the image from the camera, then output an alert if it is detected that the person left the work region after performance of the registration process is started but before the payment process is completed.

18 Claims, 8 Drawing Sheets

(51) Int. Cl.
    *G06V 20/52*       (2022.01)
    *G06V 40/10*       (2022.01)
    *H04N 7/18*       (2006.01)

(52) U.S. Cl.
    CPC .............. *G06V 20/52* (2022.01); *G06V 40/10*
               (2022.01); *H04N 7/18* (2013.01)

(58) Field of Classification Search
    USPC .......................................................... 705/18
    See application file for complete search history.

(56)                   References Cited

U.S. PATENT DOCUMENTS

| | | |
|---|---|---|
| 2018/0204200 A1 | 7/2018 | Kakino |
| 2018/0240090 A1 | 8/2018 | Yokoyama |
| 2018/0365666 A1 | 12/2018 | Kakino |
| 2019/0327451 A1 | 10/2019 | Takeno |

FOREIGN PATENT DOCUMENTS

| | | | |
|---|---|---|---|
| JP | 2019-008355 A | 1/2019 |
| JP | 2019-096035 A | 6/2019 |
| WO | 2016/052229 A | 4/2016 |

OTHER PUBLICATIONS

Decision of Refusal mailed Jul. 23, 2024 in corresponding Japanese Patent Application No. 2020-203454, 6 pages (with Translation).

\* cited by examiner

FIG. 9

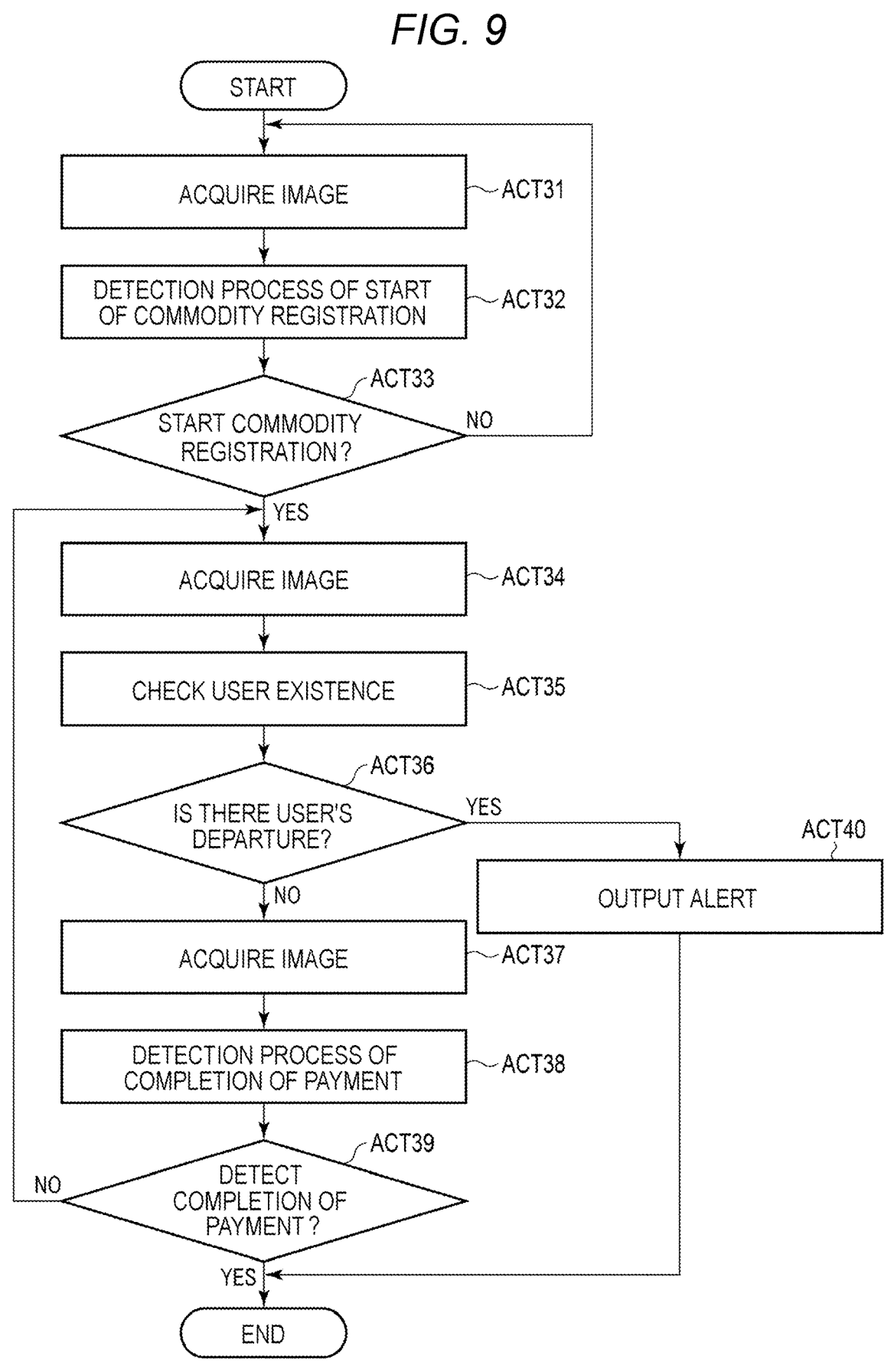

```
                        ┌──────────────┐
                        │    START     │
                        └──────┬───────┘
                               │ ◄─────────────────────────┐
                  ┌────────────▼────────────┐              │
                  │     ACQUIRE IMAGE       │── ACT31      │
                  └────────────┬────────────┘              │
                  ┌────────────▼────────────┐              │
                  │  DETECTION PROCESS OF    │── ACT32      │
                  │  START OF COMMODITY      │              │
                  │     REGISTRATION         │              │
                  └────────────┬────────────┘              │
                               │          ACT33            │
                        ◇──────────────◇   NO              │
                       < START COMMODITY >──────────────────┘
                       <  REGISTRATION?  >
                        ◇──────────────◇
                               │ YES
            ┌──────────────────┤
            │     ┌────────────▼────────────┐
            │     │     ACQUIRE IMAGE       │── ACT34
            │     └────────────┬────────────┘
            │     ┌────────────▼────────────┐
            │     │  CHECK USER EXISTENCE   │── ACT35
            │     └────────────┬────────────┘
            │                  │          ACT36
            │           ◇──────────────◇   YES          ┌──────── ACT40
            │          < IS THERE USER'S >──────────┐    ┌──────────────────────┐
            │          <   DEPARTURE?    >          └───▶│    OUTPUT ALERT       │
            │           ◇──────────────◇                └───────────┬──────────┘
            │                  │ NO                                 │
            │     ┌────────────▼────────────┐                       │
            │     │     ACQUIRE IMAGE       │── ACT37               │
            │     └────────────┬────────────┘                       │
            │     ┌────────────▼────────────┐                       │
            │     │  DETECTION PROCESS OF   │── ACT38               │
            │     │  COMPLETION OF PAYMENT  │                       │
            │     └────────────┬────────────┘                       │
            │                  │          ACT39                     │
            │   NO      ◇──────────────◇                            │
            └──────────<     DETECT      >                          │
                       <  COMPLETION OF  >                          │
                       <    PAYMENT?     >                          │
                        ◇──────────────◇                           │
                               │ YES ◄─────────────────────────────┘
                        ┌──────▼───────┐
                        │     END      │
                        └──────────────┘
```

CHECKOUT APPARATUS, MONITORING APPARATUS, AND MONITORING METHOD

CROSS-REFERENCE TO RELATED APPLICATION

This application is a continuation of U.S. patent application Ser. No. 17/461,430, filed Aug. 30, 2021, which is based upon and claims the benefit of priority from Japanese Patent Application No. 2020-203454, filed Dec. 8, 2020, the entire contents of which are incorporated herein by reference.

FIELD

Embodiments described herein relate generally to a checkout apparatus, a monitoring apparatus, and a monitoring method.

BACKGROUND

In the related art, there is a self-service registration apparatus (also referred to as a self-service checkout apparatus in some instances) that a customer can operate to register and settle purchases being made at a retail store or the like. Some self-service registration apparatuses of the related art have a function of alerting the customer if there still appears to be an unregistered item when the user tries to begin the payment (settlement) process.

However, in the self-service registration apparatus of the related art, during the series of processes including registering the items (commodities) being purchased and the payment process, whether or not the customer is continuously present at the apparatus is not monitored. Thus, it is not possible to issue an alert when a customer who has started a commodity registration process at the self-service registration apparatus leaves the self-service registration apparatus before proceeding to the payment process.

BRIEF DESCRIPTION OF THE DRAWINGS

FIG. 9 is a flowchart illustrating a person monitoring process in a monitoring apparatus.

DETAILED DESCRIPTION

The present disclosure describes a checkout apparatus, a monitoring apparatus, and a monitoring method capable of monitoring for the continued presence of a person during a commodity registration process and a payment process at a self-checkout apparatus or the like to prevent problems that may occur when customers begin but fail to complete a self-checkout processing.

In general, according to one embodiment, a checkout apparatus includes a camera interface and a processor. The camera interface is configured to acquire an image from a camera positioned to image a work region of the checkout apparatus and its surroundings in which a person performs a registration of items in a sales transaction and settlement of the sales transaction. The processor is configured to perform a registration process for registering items in the sales transaction and also a payment process for settlement of the sales transaction based on the items registered in the registration process. The processor detects whether a person has left the work region based on the image from the camera, and then outputs an alert if it is detected that the person left the work region after performance of the registration process is started but before the payment process is completed.

Hereinafter, certain example embodiments will be described with reference to the drawings.

First Embodiment

Figure 1:
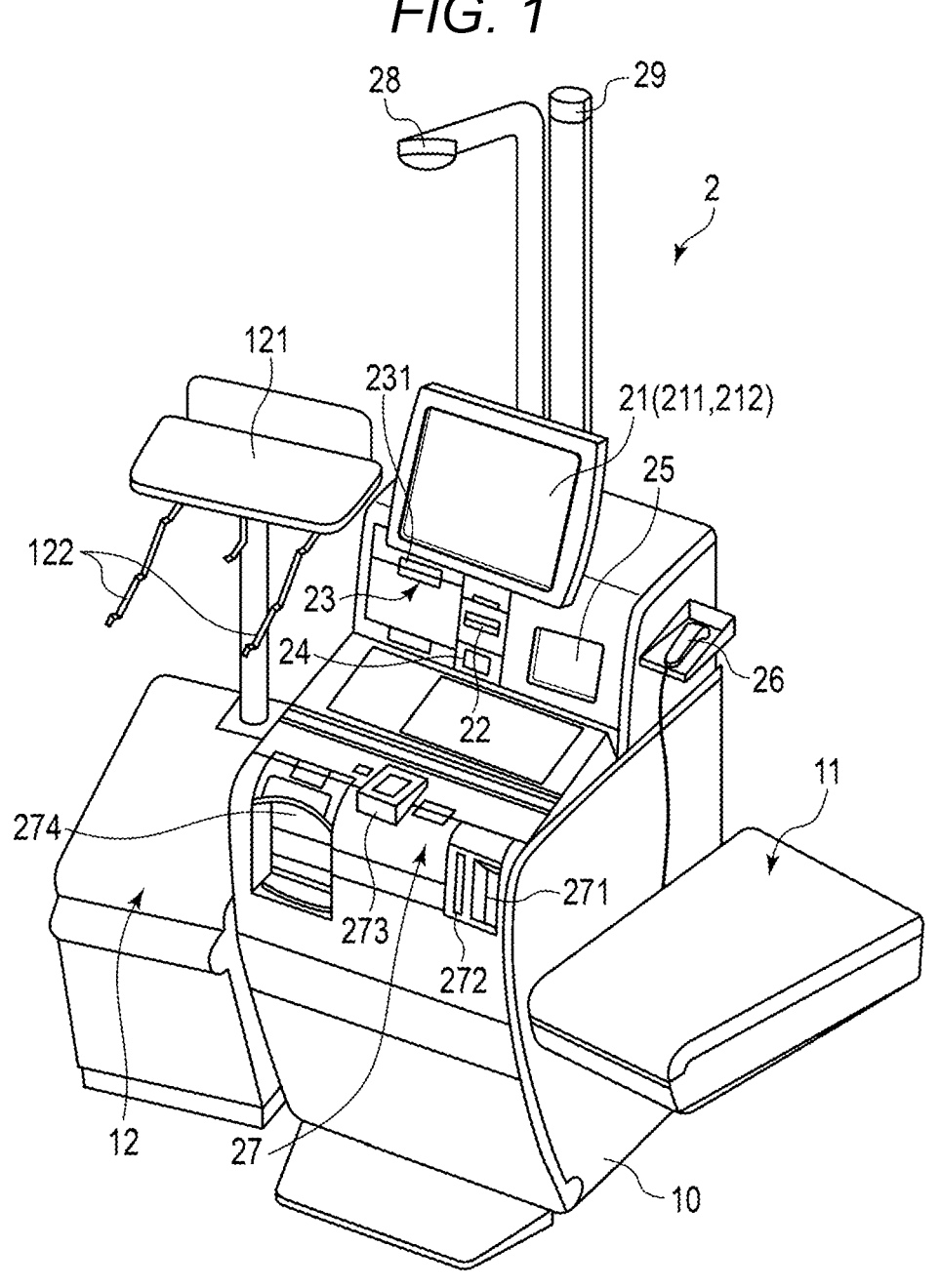
FIG. 1 is a diagram illustrating a configuration example of an appearance of a checkout apparatus according to a first embodiment.

FIG. 1 is a diagram illustrating a configuration example of a checkout apparatus 2 according to the first embodiment.

The checkout apparatus 2 illustrated in FIG. 1 executes a commodity registration (e.g., item reading/scanning) process and a payment process. In the first embodiment, it is assumed that the checkout apparatus 2 is a self-service checkout apparatus (or a self-service registration apparatus) that permits a customer (user) to perform the commodity registration process and the payment process for the commodities (items) being purchased by the customer.

As illustrated in FIG. 1, the checkout apparatus 2 includes a main body 10. A first commodity stand 11 and a second commodity stand 12 arranged on the left and right sides of the main body 10. The first commodity stand 11 is a commodity mounting place on which the commodities are to be placed before the registration process. The commodities after being registered in the registration process are then placed on the second commodity stand 12. However, the unregistered commodities may remain in a shopping cart (hereinafter referred to as a cart) or basket rather than being placed directly on the commodity stand 11. In this case, a predetermined position for the cart with unregistered items may be within the imaging range of the security camera 4.

The first commodity stand 11 is arranged on the right side of the main body 10 (when looking toward the main body 10 from the front side). For example, individual items from the cart (or other container) can be placed on the first commodity stand 11. In some examples, the commodities to be purchased by the user may remain within the cart (or other container).

The second commodity stand 12 is arranged on the left side of the main body 10 (when looking toward the main body 10 from the front side). The commodities that are picked up by the user from the first commodity stand 11 then registered (by scanning, tag reading, manual input of a product code, or the like). After being registered each item is placed on the second commodity stand 12. That is, each item after being registered by the user is to be placed on the second commodity stand 12. The commodities for which the barcodes have been read by a scanner in the main body 10 or otherwise registered in the transaction are to be placed on the second commodity stand 12 after being registered. In the configuration example illustrated in FIG. 2, a temporary placement stand 121 is provided to an upper portion of the second commodity stand 12 through support columns. The temporary placement stand 121 is used, for example, for temporarily holding the commodities before the commodities are put into a shopping bag. A pair of holding arms 122 are separated from each other on the left and right sides of the temporary placement stand 121. The holding arms 122 are locked in a state in which a shopping bag (e.g., a plastic bag) held therebetween will be in an open state.

A display 21, a card reader-writer 22 (card R-W 22), a printer 23, a speaker 24, a scanner 25, a hand scanner 26, and a cash processor 27 are provided in the main body 10. Furthermore, a camera 28 and a warning light 29 are provided on the main body 10 via the support columns.

The display 21 is a touch panel including a display device 211 and a touch sensor 212. The display device 211 displays an operation guide, a customer-selectable icon (touch key), a warning message (an alert), and the like. The display device 211 is, for example, a liquid crystal display (LCD). The touch sensor 212 detects a touched position on the display screen (operation screen) of the display device 211. The touch sensor 212 transmits information indicating the detected touch position to a processor described later as a processing unit.

For example, the display device 211 displays a graphical user interface (GUI) for permitting a user to input selection instructions such choosing a payment method (cash, card) and/or various other information by a customer's touch operation. In addition, the display device 211 displays a guidance screen, an information input screen, a commodity registration screen, a calculation screen, and the like. The guidance screen is a screen for displaying guidance (message to a user/operator) for informing the customer of the correct operation method. The information input screen is, for example, an operation screen for inputting information about commodities (items) to which barcodes are not attached. The commodity registration screen is a screen for displaying information about the registered commodity. On the commodity registration screen, information about commodities identified by the barcodes (as read by the scanner 25 or the hand scanner 26), commodities designated by user input key operation, or the like can be displayed. The calculation screen is a screen that displays the total amount (total amount due) for the purchased (registered) commodities, the deposit amount (amount tendered), the change due amount, and the like in the payment process in which the customer pays the prices for the registered commodities.

The card reader-writer (R-W) 22 processes the card. The card R-W 22 has a card insertion slot. The card R-W 22 has a function of reading data recorded on the card and a function of writing data to the card. The card R-W 22 may be a magnetic card reader that also records magnetic information or may be a contact type or non-contact type IC card reader. In addition, the card R-W 22 may have of the capability of processing a plurality of types of cards.

For example, the card R-W 22 processes a card such as a credit card for payment (settlement) purposes or a membership card for participating in a customer loyalty program or the like. The card R-W 22 reads a card inserted into a card insertion slot or the like. As a card presented for settlement, there are a credit card, a debit card, an electronic money card, a prepaid card (gift card), and the like. In addition, as the membership card, there can be a member's card that records member information or a points card that records points that can be used for various benefits, and the like.

The printer 23 prints a receipt. The printer 23 has a receipt issuing port. The printer 23 issues the receipt by printing various character strings, images, and the like on receipt paper. The printer 23 can be a thermal printer, a dot impact printer, or the like. For example, when the payment process is completed, the printer 23 generates a receipt on which transaction processing content (e.g., payment information) is printed and ejects the generated receipt from a receipt issuing port 231.

The speaker 24 outputs a sound such as an alert warning sound or a voice as a message.

The scanner 25 and the hand scanner 26 read information that identifies the commodities being purchased. In the present embodiment, it is assumed that the scanner 25 and the hand scanner 26 read a barcode attached to each commodity as the information for identifying the commodity. The scanner 25 optically reads the image of the barcode of a commodity held by the customer so that the barcode attached to the commodity faces the scanner 25. The hand scanner 26 is hand-held and can be operated by the customer to optically read the image of a barcode by being brought close to the barcode attached to the commodity. It is noted that the scanner 25 and the hand scanner 26 may be any type of product registration device that reads or otherwise acquires information for recognizing a commodity and may be, for example, one that reads information other than by barcode.

The cash processor 27 is a machine that processes cash payments and change making. The cash processor 27 has a bill insertion slot, a bill ejection port, a coin insertion slot, a coin ejection port, and the like. The cash processor 27 processes (identifies and counts) the bills inserted into a bill insertion slot 271. The cash processor 27 ejects bills as change from a bill ejection port 272. The cash processor 27 also receives and processes (identifies and counts) coins inserted into a coin insertion slot 273. The cash processor 27 ejects coins as change from a coin ejection port 274.

The camera 28 captures images of an area (work area) in which the user performs the work associated with the commodity registration process and the payment process. For example, the camera 28 is installed so that the first commodity stand 11 and the second commodity stand 12 are included in the imaging range (field of view). The camera 28 images the performing the commodity registration process. For example, the camera 28 captures images of the user removing each of the commodities (unregistered commodities) from first commodity stand 11, performing registration of each of commodities, and then placing each of the now-registered commodities on the second commodity stand 12. In addition, the camera 28 captures images of the user performing the payment process. For example, images of the user operating the display 21 and settling the calculated amount due for the registered commodities by using cash, a card, or the like are captured by the camera 28. The camera 28 is set to image the entire area in which it is expected that the user will perform the work associated with the commodity registration process and the payment process. By storing the images (e.g., video) captured by the camera 28 in a data memory 43 or the like, the images (e.g., video) can be used to check the status if an error occurs.

In addition, the camera 28 may capture an image for detecting the start of the commodity registration process and the end of the payment process. For example, the camera 28 is set to image the commodities before the commodity registration process (an image of the unregistered item(s)). By detecting that the user picked up an unregistered commodity in an image captured by the camera 28, it is possible to detect that the commodity registration process has started. In addition, the camera 28 is set to image the area including the receipt issuing port. In this case, by detecting that the receipt is ejected from the receipt issuing port in an image captured by the camera 28, it is also possible to detect that the payment process has been successfully completed (ended).

Next, the configuration of the control system in the checkout apparatus 2 according to the first embodiment will be described.

Figure 2:
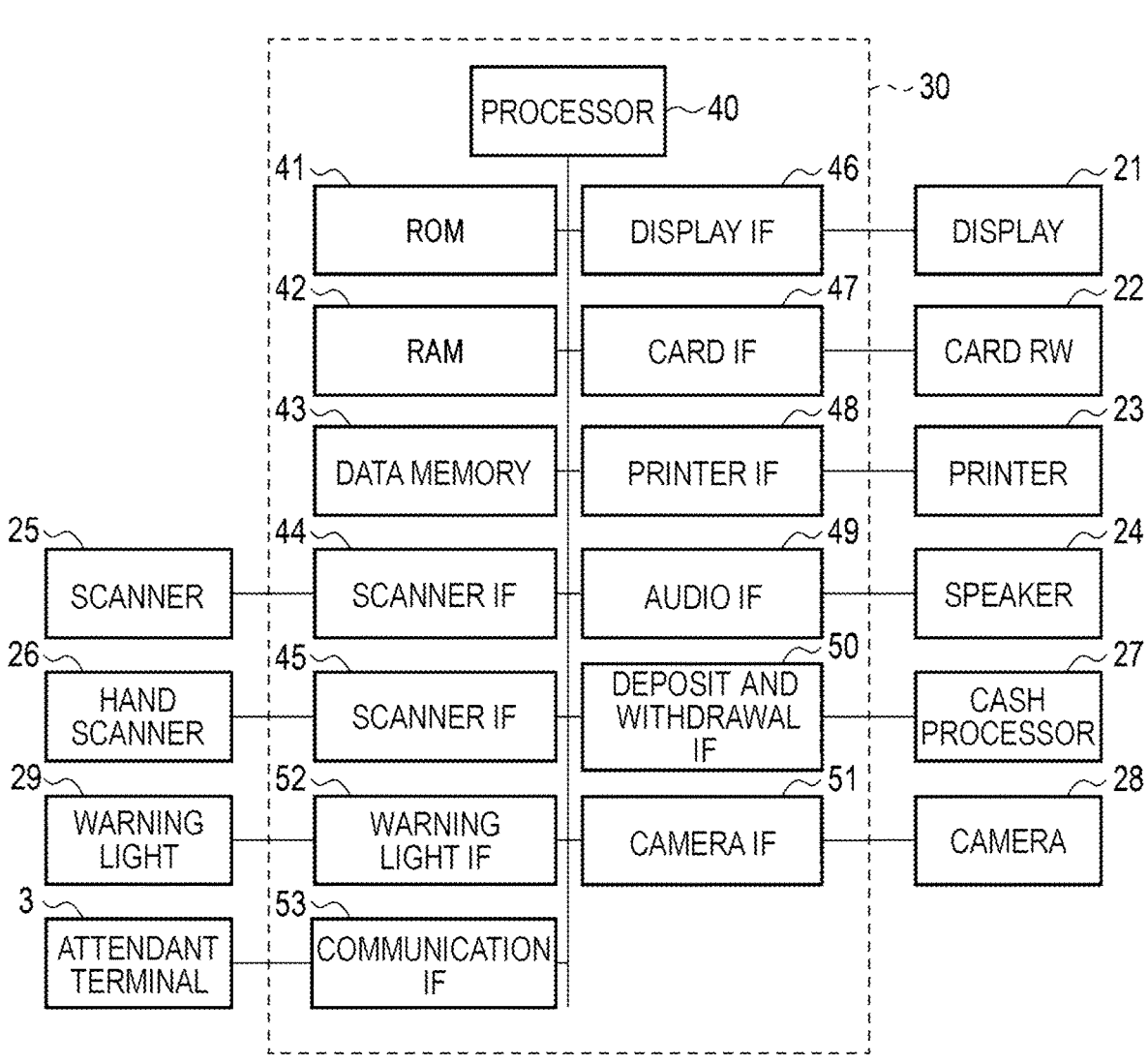
FIG. 2 is a block diagram illustrating a configuration of a control system in a checkout apparatus.

FIG. 2 is a block diagram illustrating a configuration example of the control system in the checkout apparatus 2 according to the first embodiment.

In the configuration example illustrated in FIG. 2, the main body 10 of the checkout apparatus 2 includes a control unit 30. The control unit 30 is implemented by, for example, as a computer executing software. A display 21, the card R-W 22, the printer 23, the speaker 24, the scanner 25, the hand scanner 26, the cash processor 27, the camera 28, the warning light 29, and the like are electrically connected to the control unit 30. In addition, the control unit 30 includes a processor 40, a read-only memory (ROM) 41, a random-access memory (RAM) 42, a data memory 43, and various interfaces (IFs) 44 to 53.

The processor 40 executes various processes (functions) by executing a program. The processor 40 is, for example, a central processing unit (CPU). The processor 40 implements various processing functions by executing a program stored in the ROM 41 or the data memory 43. For example, the processor 40 executes a registration mode in which the commodity registration process for registering (inputting) the commodity information by executing a program for registering (inputting) the commodities. The processor 40 executes the payment process for settling the prices of the commodities in a payment mode by executing a program for the payment process.

The ROM 41 is a non-volatile memory and stores programs and data. For example, the ROM 41 stores programs such as an operating system, middleware, and applications. In addition, the ROM 41 may store data to be referred to when the processor 40 executes various processes.

The RAM 42 stores data and acts a work area for the processor 40. The RAM 42 is a memory used as a so-called work area. The RAM 42 appropriately stores data that the processor 40 refers to when executing various processes, data that is temporarily used, or the like.

The data memory 43 is a memory for storing data. The data memory 43 is a rewritable non-volatile memory. The data memory 43 is configured with, for example, an electrically erasable programmable read-only memory (EE-PROM®), a hard disk drive (HDD), a solid-state drive (SSD), or the like. The data memory 43 stores data used when the processor 40 executes various processes or data generated in a process by the processor 40. In addition, the data memory 43 may store various programs executed by the processor 40. For example, the data memory 43 may store a program for the registration process and a program for the payment process.

In addition, the RAM 42 or the data memory 43 stores information about the commodities (the registered commodities) registered in the commodity registration process. The RAM 42 or the data memory 43 may record, for example, the information about the registered commodities as list-format data (also referred to as a registered commodity list). In addition, the RAM 42 or the data memory 43 stores the captured image captured by the camera 28. The data memory 43 may store, for example, video data obtained by adding a time stamp indicating an imaging time (image acquisition time) to the image captured by the camera 28.

The processor 40 is connected to the scanner 25 via the scanner IF 44. The processor 40 acquires an image (scanned image) that has been acquired by the scanner 25 via the scanner IF 44. In addition, the processor 40 is connected to the hand scanner 26 via the scanner IF 45. The processor 40 acquires an image (scanned image) that has been acquired by the hand scanner 26 via the scanner IF 45. The processor 40 identifies a commodity as indicated by a barcode by decoding the barcode in the scanned image from the scanner 25 or the hand scanner 26.

The processor 40 is connected to the display 21 via the display IF 46. The processor 40 controls display contents displayed by the display device 211 of the display 21 via the display IF 46. In addition, the processor 40 acquires information indicating a touch position detected by the touch sensor 212 of the display 21 via the display IF 46. For example, the processor 40 displays a message on the display 21 as an alert or an indicator for notifying the existence of a still remaining unregistered commodities. In addition, the processor 40 detects the input to each icon (touch key) displayed on the display 21 based on the information indicating the touch position.

The processor 40 is connected to the card R-W 22 via the card IF 47. The processor 40 controls the processing of the card by the card R-W 22 via the card IF 47. For example, the processor 40 executes a credit card calculation process processed by the card R-W 22.

The processor 40 is connected to the printer 23 via the printer IF 48. The processor 40 controls the printer 23 via the printer IF 48. For example, the processor 40 issues the receipt illustrating the result of the payment process by the printer 23.

The processor 40 is connected to the speaker 24 via the audio IF 49. The processor 40 controls the sound output from the speaker 24 via the audio IF 49. For example, the processor 40 outputs a sound (e.g., a buzzer) as an alert for notifying the existence of still unregistered commodities using the speaker 24.

The processor 40 is connected to the cash processor 27 via the deposit and withdrawal IF 50. The processor 40 controls the cash processor 27 via the deposit and withdrawal IF 50. For example, the processor 40 counts the cash deposited by the customer using the cash processor 27 and acquires information indicating the deposit amount counted by the cash processor 27. In addition, the processor 40 controls the cash processor 27 to release the change amount due as calculated from the deposited amount and the total amount due (sum of the purchased commodity prices) for the registered commodities.

The processor 40 is connected to the camera 28 via the camera IF 51. The processor 40 acquires the captured image from the camera 28 via the camera IF 51. For example, the processor 40 starts acquiring the captured image from the camera 28 when the commodity registration process is started. In addition, during the commodity registration process and the payment process, the processor 40 acquires captured images continuously (for example, at a predetermined frequency, rate, or fixed interval) from the camera 28. The processor 40 ends the acquisition of the captured image form the camera 28 when the payment process is ended.

The processor 40 is connected to the warning light 29 via the warning light IF 52. When the processor 40 detects that the user is departing (or has departed), the processor 40 turns on the warning light 29 for issuing a warning via the warning light IF 52.

The processor 40 is connected to an external apparatus via the communication IF 53. The communication IF 53 may be a communication interface for performing network communication with the external apparatus or may be an interface for locally connecting to the external apparatus. The communication IF 53 may be an interface for wireless communication or an interface for wired communication. In addition, the communication IF 53 may be one communication interface or a plurality of communication interfaces.

For example, the processor 40 is connected to an attendant terminal 3 via the communication IF 53. The attendant terminal 3 notifies the staff member about the usage status of the checkout apparatus 2 being monitored. The attendant terminal 3 is connected to the checkout apparatus 2. When a plurality of the checkout apparatuses 2 are to be monitored, the attendant terminal 3 unitarily monitors the usage status and the like of the plurality of checkout apparatuses 2 to be monitored. The attendant terminal 3 has a display 70 (refer to FIG. 3) that displays information indicating the usage status of each checkout apparatus 2 to be monitored. In this case, the processor 40 transmits information indicating the operating status to the attendant terminal 3 via the communication IF 53. For example, the processor 40 transmits information to the attendant terminal 3 indicating the registration status of the commodities at the checkout apparatus 2 or the execution status of the payment process. In addition, when the processor 40 detects the user's departure during processing, the processor 40 transmits an alert to the attendant terminal 3 via the communication IF 53.

In addition, the processor 40 may be connected to another computer such as a management server via the communication IF 53. For example, the processor 40 transmits information to the management server via the communication IF 53 indicating the commodities are being registered at the checkout apparatus 2 or that payment process has been completed. In addition, the processor 40 may appropriately acquire information about the commodities from a store computer (store server) that communicates via the communication IF 53.

Next, a configuration of the attendant terminal 3 communicatively connected to the checkout apparatus 2 according to the first embodiment will be described.

Figure 3:
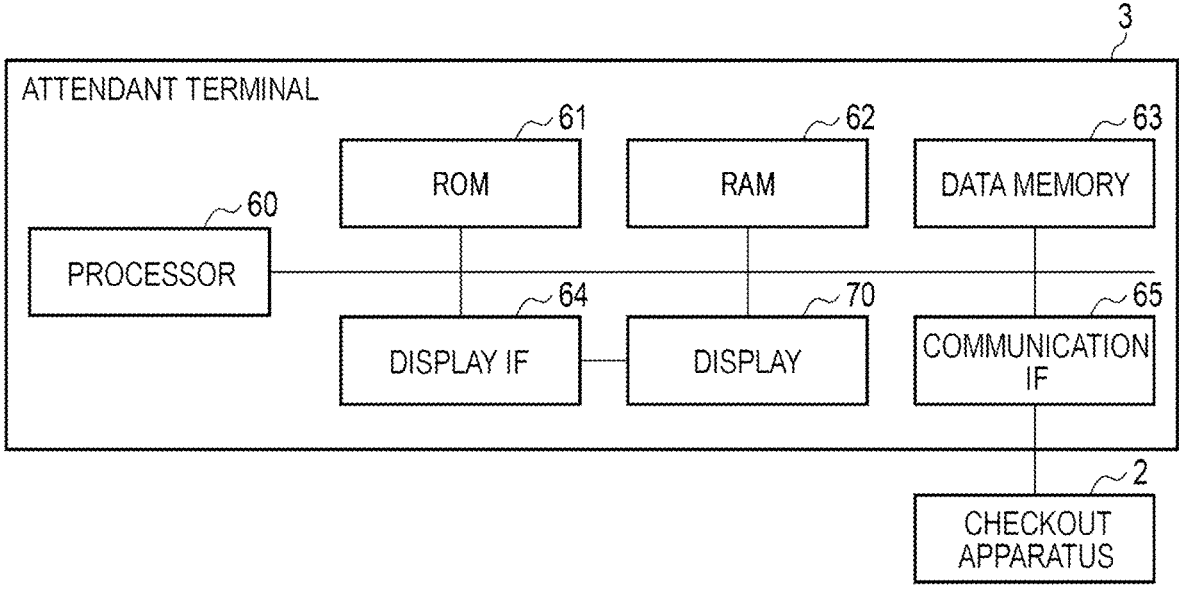
FIG. 3 is a block diagram illustrating a configuration of an attendant terminal connected to a checkout apparatus.

FIG. 3 is a block diagram illustrating a configuration example of the control system in the attendant terminal 3 according to the first embodiment.

In the configuration example illustrated in FIG. 3, the attendant terminal 3 includes the display 70. The attendant terminal 3 is implemented as a computer or the like having a display. The attendant terminal 3 includes a processor 60, a read-only memory (ROM) 61, a random-access memory (RAM) 62, a data memory 63, a display interface (IF) 64, and a communication interface (IF) 65.

The processor 60 executes various processes by executing a program. The processor 60 is, for example, a central processing unit (CPU). The processor 60 implements various processing functions by executing a program stored in the ROM 61 or the data memory 63. For example, the processor 60, by executing a monitoring program, displays an alert on the display 70 in response to an alert notification from the checkout apparatus 2 or displays an image captured by the camera 28.

The ROM 61 is a non-volatile memory and stores programs and data. For example, the ROM 61 stores programs such as an operating system, middleware, and applications. In addition, the ROM 61 may store data to be referred to when the processor 60 executes various processes.

The RAM 62 stores data for work. The RAM 62 is a memory used as a so-called work area. The RAM 62 appropriately stores data that the processor 60 refers to when executing various processes, data that is temporarily used, or the like.

The data memory 63 is a memory for storing data. The data memory 63 is a rewritable non-volatile memory. The data memory 63 is configured with, for example, an electrically erasable programmable read-only memory (EE-PROM®), a hard disk drive (HDD), a solid state drive (SSD), or the like. The data memory 63 stores data used when the processor 60 executes various processes or data generated in a process by the processor 60. In addition, the data memory 63 may store various programs executed by the processor 60.

The processor 60 is connected to the display 70 via the display IF 64. The processor 60 controls the display contents displayed by the display device of the display 70 via the display IF 66. In addition, the display 70 may be a display device having a built-in touch sensor. In this case, the processor 60 may acquire information indicating the touch position detected by the touch sensor of the display 70 via the display IF 64. For example, the processor 60 detects an input to each icon (touch key) displayed on the display 70 based on the information indicating the touch position.

The processor 60 is connected to the checkout apparatus 2 via the communication IF 65. The communication IF 65 may be any communication interface type that permits communication with the checkout apparatus 2. For example, the communication IF is a network interface for communicating with the checkout apparatus 2 via a network such as a local area network (LAN). For example, the processor 60 acquires information indicating the transaction content of the commodity registration process and/or the payment process from the checkout apparatus 2 via the communication IF 65. In addition, the processor 60 acquires an alert, such as an alert of a user's departure, from the checkout apparatus 2 via the communication IF 65. In addition, the processor 60 may acquire the captured image from the camera 28 from the checkout apparatus 2 via the communication IF 65.

Next, operations including the commodity registration process and the payment process by the checkout apparatus 2 according to the first embodiment will be described.

Figure 6:
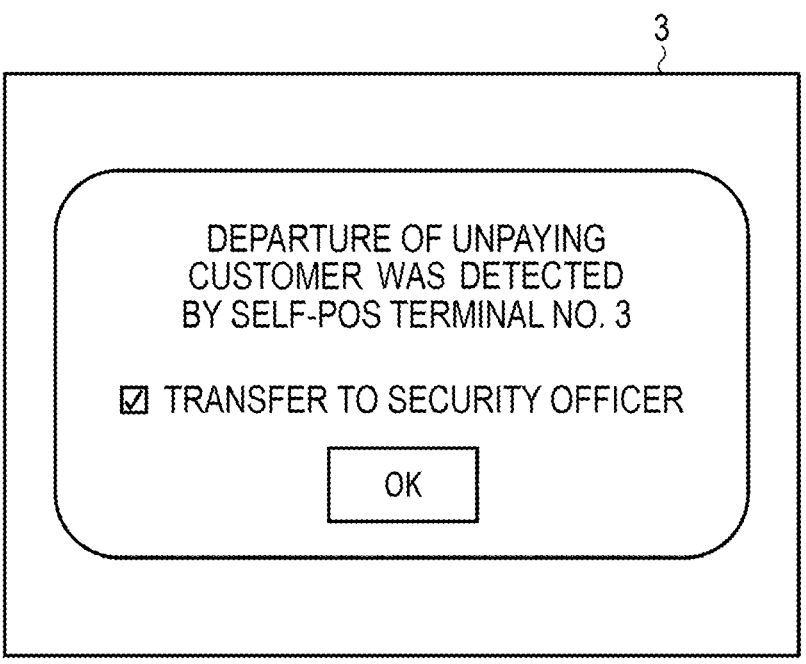
FIG. 6 is a diagram illustrating an alert to be displayed on a display of an attendant terminal.

FIG. 6 is a flowchart illustrating an operation example including the commodity registration process and the payment process by the checkout apparatus 2 according to the first embodiment.

Herein, it is assumed that the user with the commodities to be purchased visits in front of the checkout apparatus 2. The user sets the commodities to be checked out (the commodities before the registration) at a predetermined position. For example, the user mounts a basket (or other container) in which the commodities (target commodities) to be checked out are placed on to the first commodity stand 11. In addition, the user may of course, directly place the commodities to be purchased on the first commodity stand 11. In addition, the user may position a cart (in which the commodities to be purchased have been placed) at a predetermined position.

After setting the commodities to be purchased in a designated commodity mounting place, the user instructs the start of the checkout process or the commodity registration process with a predetermined operation. For example, the user instructs the start of the commodity registration process by touching the touch key displayed on the display 21. In addition, the start of the commodity registration process may be recognized by the processor 40 according to the user's motion. For example, the processor 40 may recognize the user's motion by analyzing an image captured by the camera 28, and may determine the start of the commodity registration process in response to the recognition of the user's motion.

The processor 40 of the checkout apparatus 2 executes the commodity registration process of registering the commodity information of the target commodities in response to the instruction to start the commodity registration process (ACT 11). In the commodity registration process (a registration mode), the processor 40 identifies each commodity in turn by a barcode read by the scanner 25 or the hand scanner 26 in response to the user's scanning operations. If the commodity can be identified by the barcode, the processor 40 registers the information (commodity information) regarding the identified commodity.

In addition, in the commodity registration process, the processor 40 may register commodities as designated by the user by, for example, manual input of a commodity code or user selection of a particular commodity type from a plurality of possible commodity types. For example, the processor 40 may register the picked-up commodities as the commodities designated by the user operating the touch key for displaying the commodities on the display 21. The user who decides that the commodity registration has been completed instructs the proceeding to the payment process (the end of the commodity registration process). For example, the user instructs the proceeding to the payment process by operating a touch key displayed on the display 21.

When the proceeding to the payment process is instructed (YES in ACT 12), the processor 40 proceeds to the payment process for the now-registered commodities. When the processor 40 proceeds to the payment process, the processor 40 executes the payment process for settling the total amount due for all the registered commodities (ACT 13). For example, the processor 40 calculates the total amount due for the registered commodities by multiplying a price of each registered commodity type by the number of commodities being purchased of the registered commodity type, the summing the costs of the registered commodities. The processor 40 displays the calculated total amount due in the sales transaction on the display 21 and performs a process for receiving the total amount from the user. When the receipt of the total amount due is completed, the processor 40 dispenses a receipt reflecting the transaction from the printer 23 and ejects the receipt from the receipt issuing port 231. The processor 40 causes the printer 23 to dispense the receipt indicating the transaction contents and ends the payment process for the commodity registered by the commodity registration process.

When the payment process for the registered commodities is ended, the processor 40 next determines whether or not the user immediately begins to perform registration and payment for other commodities not in the previous sales transaction (ACT 14). If the user executes another commodity registration process in this manner, the user instructs the start of the next commodity registration process. For example, when the processor 40 receives an instruction to start the registration process for additional commodities from the user within a predetermined period after the previous completion of the payment process, the processor 40 returns to ACT 11 and executes the commodity registration process on the additional commodities. If the start of the registration process for the next commodity is not instructed within the predetermined period, the processor 40 ends the processes for the user.

In addition, the processor 40 may receive an instruction to start the registration process for another commodity even after the payment process is ended until the user departs from a predetermined area (for example, a work area). Whether or not the user has departed the predetermined area may be detected by the processor 40 from a captured image from the camera 28. If the user departs the predetermined area or if an instruction to end a series of processes by the user is input, the processor 40 ends the process for the user.

Next, the person monitoring process (person departure detection process) in the checkout apparatus 2 according to the first embodiment will be described.

Figure 5:
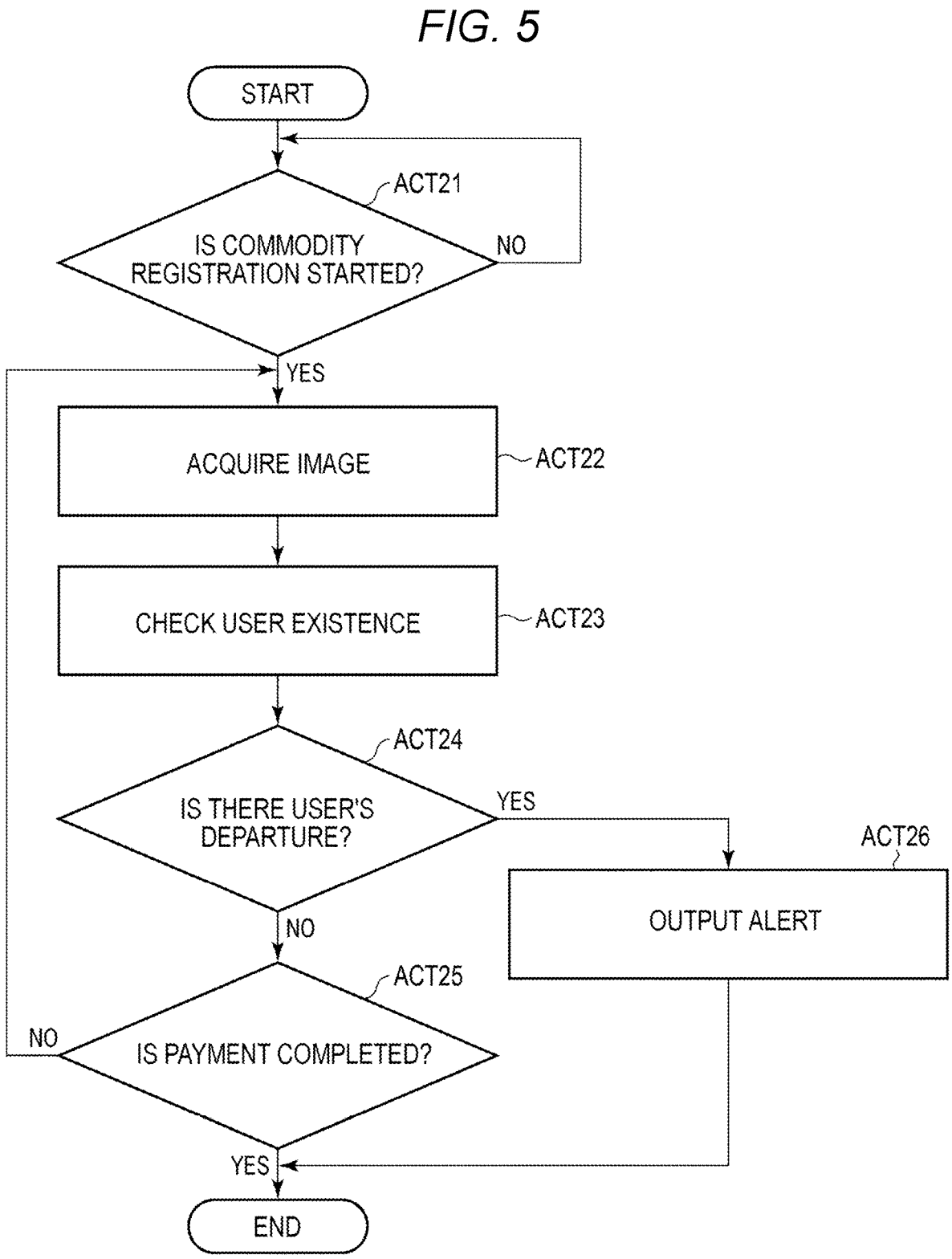
FIG. 5 is a flowchart illustrating a person monitoring process in a checkout apparatus.

FIG. 5 is a flowchart illustrating the person monitoring process (person departure detection process) by the checkout apparatus 2 according to the first embodiment.

The processor 40 of the checkout apparatus 2 receives the start instruction for the commodity registration process in the waiting state. As described above, when the processor 40 receives the instruction to start the checkout process or the commodity registration process from the user, the processor 40 starts the commodity registration process. In addition, the processor 40 may start the commodity registration process in response to a user's motion (e.g., an approach to the checkout apparatus or an attempt to register an item) being detected from the image captured by the camera 28.

If the commodity registration process is started (YES in ACT 21), the processor 40 begins acquiring the images captured by the camera 28 via the camera IF 51 (ACT 22). For example, the processor 40 acquires an image (video) of the imaging range including the work area to be monitored.

The processor 40 checks whether or not the user exists in the work area (ACT 23) using the image captured by the camera 28 and then acquired via the camera IF 51. The processor 40 performs an existence check for determining whether or not the user exists (is present) in the work area by analyzing the image captured by the camera 28. For example, the processor 40 determines whether the user is inside the work area by using a skeleton estimation technique such as OpenPose. In addition, the processor 40 may determine whether the user is in the work area by using an object detection technique such as a single shot multibox detector (SSD multibox).

The processor 40 determines whether or not the user has departed based on the result of the user existence check based on the image captured by the camera 28 (ACT 24). For example, when the processor 40 detects that the user is not in the work area, the processor 40 determines that the user has departed. In addition, when the period during which the user is no longer in the work area exceeds a predetermined period, the processor 40 may determine that the user has departed.

If it is determined that the user has departed (YES in ACT 24), the processor 40 outputs an alert (ACT 26). For example, the processor 40 turns on the warning light 29 as an alert notification. In addition, the processor 40 sends an alert notice to the attendant terminal 3 via the communication IF 53 indicating that it has been detected that a customer who has not yet paid has left the work area (or monitored area). In response the alert notice from the checkout apparatus, the attendant terminal 3 displays, on the display 70, that it has been detected that the user departed. Accordingly, the observer who performs monitoring at the attendant terminal can recognize the checkout apparatus 2 from which the user's departure was detected and, thus, can visually confirm the user's behavior.

FIG. 6 is a diagram illustrating a display example of a warning screen displayed on the display 70 of the attendant terminal 3.

In the display example illustrated in FIG. 6, the attendant terminal 3 displays, on the display 70, a warning message, "departure of unpaying customer was detected by self-POS terminal No. 3". In addition, in the display example illustrated in FIG. 6, the attendant terminal 3 displays a transfer button for instructing transfer (notification) of information to the security officer together with the warning message.

If the transfer button is pressed, the processor 60 of the attendant terminal 3 notifies the security officer of an alert including the warning message and the like. For example, it is assumed that the contact address of the security officer is stored in advance in the data memory 63 or the like as a destination that can be contacted via the communication IF 65. In this case, the processor 60 transfers (transmits) an alert including a warning message to the contact address of the security officer stored in the data memory 63 in response to the pressing of the transfer button.

It is noted that the processor 40 may be configured to send an alert to a mobile terminal possessed by a staff member such as a store clerk or a security officer who can communicate via the communication IF 53. In this case, the processor 40 sends an alert, to the mobile terminal possessed by the staff member via the communication IF 53, indicating that it was detected that the user departed. The mobile terminal possessed by the staff member may thus provide a pop up message or the like and displays the alert regarding the checkout apparatus 2. Accordingly, the staff member can recognize a user's departure has occurred and can take measures such as visually confirming the user's behavior.

If it is not detected that the user departed (it is detected that the user still remains in the work area) (NO in ACT 24), the processor 40 checks whether or not the payment process is ended (ACT 25). For example, the processor 40 determines that the payment process is ended when the total amount due for the commodities registered in the commodity registration process is received. In addition, the processor 40 may determine that the payment process is ended when the printer 23 dispenses a receipt after receiving the total amount due. In addition, the processor 40 may determine that the payment process is ended when the receipt ejected from the receipt issuing port 231 by the printer 23 is removed.

If the payment process is not completed (NO in ACT 25), the processor 40 returns to ACT 22 and repeatedly executes the above-described processing of ACT 22, etc. If the payment process is completed (YES in ACT 25), the processor 40 ends the commodity registration process and also the monitoring process for detecting the user's departure during the payment process.

It is noted that the processor 40 may store the images captured by the camera 28 in the data memory 43 regardless of whether a person is in the work area. In this case, the processor 40 records the captured image stored in the data memory 43 in association with the imaging time. Furthermore, the processor 40 may record, in the data memory 43, the time when it was initially detected that a person is in the work area (the time when the person enters the work area).

The checkout apparatus 2 according to the first embodiment checks for the user's departure using the images captured by the camera 28 after the commodity registration process is started until the payment process is ended. The checkout apparatus 2 can detect whether or not the user is in the predetermined work area in video captured by the camera 28 from the start of the commodity registration process until the completion of the payment process. The checkout apparatus 2 outputs an alert when it is detected that a user who started the commodity registration process departed the predetermined work area without completion of the payment process.

Accordingly, the checkout apparatus 2 can notify others that a user who started the commodity registration process has departed without completing or even starting the payment process.

In addition, the checkout apparatus 2 detects the presence or absence of a person in the work area from images captured by the camera 28. For this reason, the checkout apparatus 2 can reliably detect the user's departure even if the work area is large, which is unlike person detection by a motion sensor since the motion sensor cannot detect motion when shielded or blocked.

Second Embodiment

In the first embodiment, the checkout apparatus 2 has a function of detecting (monitoring) the user's departure. In contrast, in the second embodiment, it is assumed that a checkout system is configured to include a monitoring apparatus or system that is provided separately from the checkout apparatus 2 and it is the monitoring apparatus or system that detects (monitors) the user's departure from the area around the checkout apparatus 2.

Figure 7:
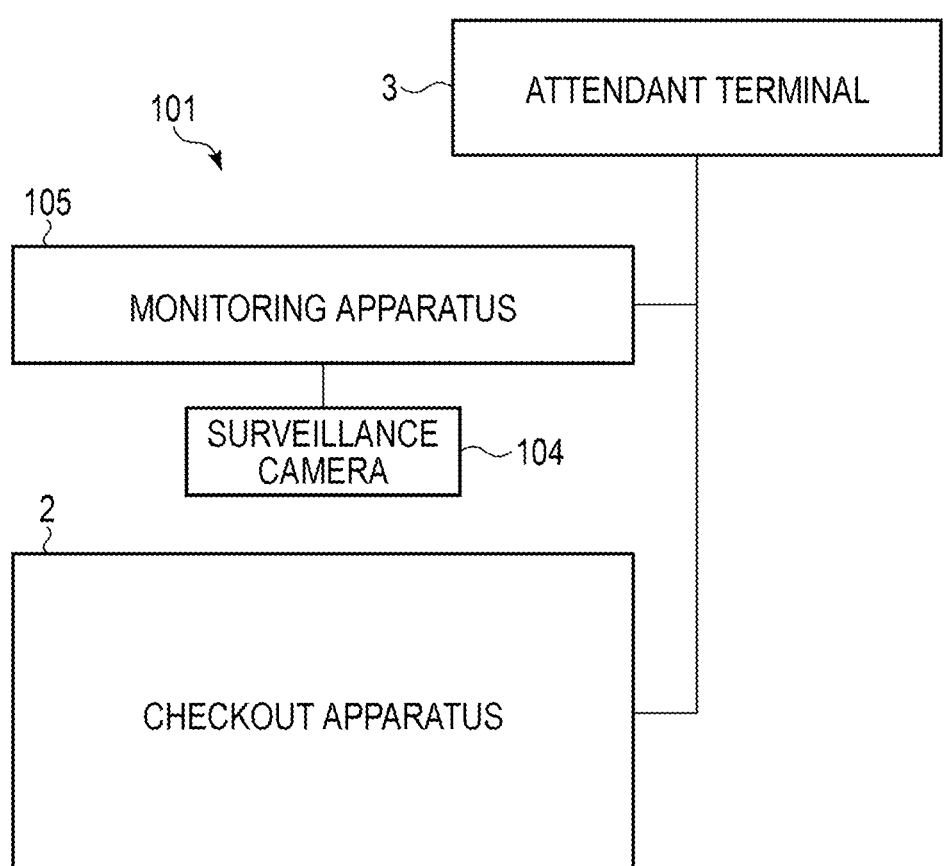
FIG. 7 is a block diagram illustrating a configuration of a checkout system including a monitoring apparatus according to a second embodiment.

FIG. 7 is a block diagram illustrating a configuration example of a checkout system 101 according to the second embodiment.

As illustrated in FIG. 7, the checkout system 101 includes a surveillance camera 104 and a monitoring apparatus (105 in addition to the checkout apparatus 2 and the attendant terminal 3. The monitoring apparatus 105 may be referred to as an image analysis apparatus.

The checkout apparatus 2 may have a hardware configuration similar to that illustrated in FIGS. 1 and 2 described in conjunction with the first embodiment. However, in the second embodiment, the processing corresponding to the person monitoring process that was described in the first embodiment as being executed by the checkout apparatus 2 itself is instead executed by the monitoring apparatus 105. For this reason, the checkout apparatus 2 according to the second embodiment may omit the configurational aspects necessary only for performing the person monitoring processing in the first embodiment.

The attendant terminal 3 may have a hardware configuration similar to that illustrated in FIGS. 1 and 3 described in the first embodiment. However, it is assumed that the attendant terminal 3 according to the second embodiment also communicates with the monitoring apparatus 105 via the communication IF 66. That is, the processor 60 of the attendant terminal 3 communicates with both the checkout apparatus 2 and the monitoring apparatus 105 via the communication IF 66. The processor 60 of the attendant terminal 3 according to the second embodiment acquires an alert or the like from the monitoring apparatus 105 via the communication IF 66. For example, if the processor 60 receives an alert from the monitoring apparatus 105 indicating that the user departed, the processor 60 displays a warning as illustrated in FIG. 6 on the display 70.

Similarly to the camera 28 described in the first embodiment, the surveillance camera 104 captures an image in which the work area is included in the imaging range. The surveillance camera 104 may be any type that can image the work area. The surveillance camera 104 is provided separately from the checkout apparatus 2 and thus may be mounted in a position separate from the checkout apparatus 2. The surveillance camera 104 needs to be communicatively connected to the monitoring apparatus 105 as illustrated in FIG. 7. In addition, in some examples, the surveillance camera 104 may be in the same position as the camera 28 included in the checkout apparatus 2 as described in the first embodiment. That is, the surveillance camera 104 can be integrated with the checkout apparatus 2, or alternatively it may be considered that the camera 28 functions as the surveillance camera 104. In this case, the monitoring apparatus 105 is configured to acquire the images from the camera 28 provided on the checkout apparatus 2 being monitored. It is noted that in the following description of the second embodiment, as illustrated in FIG. 7, it is assumed that the surveillance camera 104 is provided separately from the checkout apparatus 2 and is thus connected to the monitoring apparatus 105 rather than the checkout apparatus 2.

The surveillance camera 104 captures the predetermined work area in which the user executes the commodity registration process and the payment process on a checkout apparatus 2 being monitored. For example, the surveillance camera 104 is installed so that the first commodity stand 11 and the second commodity stand 12 of the checkout apparatus 2 to be monitored are included in the imaging range.

The surveillance camera 104 images the commodity registration process from at least after the user picks up the unregistered commodities until the user places the registered commodities on the second commodity stand 12. In addition, the surveillance camera 104 images user settling the calculated total amount due for the commodities with cash, a card, or the like. The surveillance camera 104 is set to image the work area in which the user performs the operations associated with the commodity registration process and the operation associated with the payment process.

In addition, the surveillance camera 104 captures an image for detecting the start of the commodity registration process and the end of the payment process on the checkout apparatus 2. For example, the surveillance camera 104 captures an image for detecting that the user picked up an unregistered commodity for the commodity registration process as the start of the commodity registration process. As the start of the commodity registration process, the surveillance camera 104 may capture an image for detecting that the user performed an operation of instructing the display 21 to start the commodity registration process. In addition, the surveillance camera 104 captures an image for detecting that the receipt was dispensed from the receipt issuing port 231 as the end of the payment process. In addition, the surveillance camera 104 may capture an image for detecting that the user performed an operation of instructing the display 21 to execute or end the payment process as the end of the payment process.

The monitoring apparatus 105 is an image analysis apparatus that analyzes a captured image from the surveillance camera 104. The monitoring apparatus 105 is communicatively connected to the surveillance camera 104 and the attendant terminal 3. The monitoring apparatus 105 detects whether or not the user of the checkout apparatus 2 exists in the work area by analyzing the image captured by the surveillance camera 104. The monitoring apparatus 105 detects that the user who was executing the commodity registration process and the payment process by the checkout apparatus 2 departed from the result of the user existence check in the work area. If the monitoring apparatus 105 detects that the user departed during the processing by the checkout apparatus 2, the monitoring apparatus 105 notifies an alert to the attendant terminal 3 or the checkout apparatus 2.

In addition, the monitoring apparatus 105 detects the start of the commodity registration process and the end of the payment process at the monitored checkout apparatus 2 from the images captured by the surveillance camera 104.

For example, the monitoring apparatus 105 detects that the user picked up an unregistered commodity for the commodity registration process from the image captured by the surveillance camera 104 as the start of the commodity registration process. In addition, the monitoring apparatus 105 may detect that the user performed an operation of instructing the display 21 to start the commodity registration process from the image captured by the surveillance camera 104 as the start of the commodity registration process.

In addition, the monitoring apparatus 105 detects that the receipt was dispensed from the receipt issuing port 231 from the image captured by the surveillance camera 104 as the end of the payment process. The monitoring apparatus 105 may detect that the user performed an operation of instructing the display 21 to execute or end the payment process from the image captured by the surveillance camera 104 as the end of the payment process.

In the configuration example illustrated in FIG. 7, the monitoring apparatus 105 can be configured to be communicatively connected to the checkout apparatus 2. In this case, the monitoring apparatus 105 may acquire information indicating the start of the commodity registration process and information indicating the end of the payment process from the checkout apparatus 2. However, when detecting the start of the commodity registration process and the end of the payment process from an image captured by the surveillance camera 104, the monitoring apparatus 105 may not need to be configured to communicate with the checkout apparatus 2. That is, the monitoring apparatus 105 can be configured as an apparatus independent of the checkout apparatus 2 and still be used to detect that a user departed during the execution of the commodity registration process and/or the payment process.

Next, the configuration of the control system in the monitoring apparatus 105 according to the second embodiment will be described.

Figure 8:
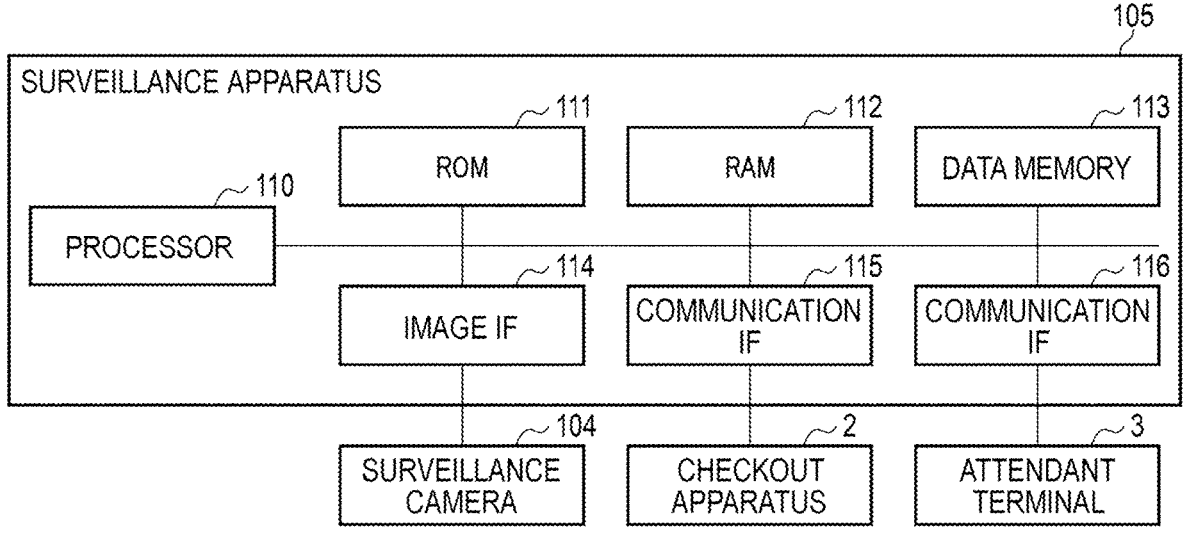
FIG. 8 is a block diagram illustrating a configuration of a control system in a monitoring apparatus.

FIG. 8 is a block diagram illustrating a configuration example of the control system in the monitoring apparatus 105 according to the second embodiment.

In the configuration example illustrated in FIG. 8, the monitoring apparatus 105 is implemented as, for example, a computer. The monitoring apparatus 105 is communicatively connected to the surveillance camera 104, the checkout apparatus 2, and the attendant terminal 3.

The monitoring apparatus 105 includes a processor 110, a read-only memory (ROM) 111, a random-access memory (RAM) 112, a data memory 113, an image interface (IF) 114, and communication interfaces (IF) 115 and 116.

The processor 110 executes various processes by executing a program. The processor 110 is, for example, a central processing unit (CPU). The processor 110 implements various processing functions by executing a program stored in the ROM 111 or the data memory 113.

For example, the processor 40 detects the presence or absence of a person in the work area of the checkout apparatus 2 from an image acquired from the surveillance camera 104 by executing a program for image analysis. In addition, the processor 40 executes a process of recognizing the motion of a person or the like from the image acquired from the surveillance camera 104 by executing a program for motion recognition. For example, the processor 40 detects the start of the commodity registration process and the end of the payment process by recognizing the operation of the user or the checkout apparatus 2.

ROM 111 is a non-volatile memory that stores programs and data. For example, ROM 111 stores programs such as operating systems, middleware, and applications. In addition, the ROM 111 may store data to be referred to when the processor 110 executes various processes.

The RAM 112 stores data for work. The RAM 112 is a memory used as a so-called work area. The RAM 112 appropriately stores data that the processor 110 refers to when executing various processes, data that is temporarily used, or the like.

The data memory 113 is a memory for storing data. The data memory 113 is a rewritable non-volatile memory. The data memory 43 is configured with, for example, an electrically erasable, programmable, read-only memory (EE-PROM), a hard disk drive (HDD), a solid state drive (SSD), or the like. The data memory 113 stores data used when the processor 110 executes various processes or data generated in a process by the processor 110.

For example, the data memory 113 stores images captured by the surveillance camera 104 for a certain period of time. Furthermore, the data memory 113 stores a series of images captured by the surveillance camera 104 that are determined to be displayed on the attendant terminal 3 by the image analysis process. In addition, the data memory 113 may store various programs executed by the processor 110. For example, the data memory 43 may store programs such as the program for image analysis processing and the program for motion recognition.

The processor 110 is connected to the surveillance camera 104 via the image IF 114. The processor 110 acquires the image (captured image) captured by the surveillance camera 104 via the image IF 114. It is noted that the camera 28 included in the checkout apparatus 2 may be used as the surveillance camera 104. In this case, the processor 110 may acquire the image captured by the camera 28 from the checkout apparatus 2 via a communication IF 115.

The processor 110 is connected to the checkout apparatus 2 via the communication IF 115. The processor 110 may acquire a signal indicating the start of the commodity registration process and the end of the payment process from the checkout apparatus 2 via the communication IF 115. In addition, the processor 110 may transmit information indicating the user status (for example, the presence or absence of a person in the work area) obtained as an analysis result on the captured image from the surveillance camera 104 to the checkout apparatus 2.

The processor 110 is connected to the attendant terminal 3 via the communication IF 116. The processor 110 transmits information obtained from the person monitoring process and a result of the image analysis process to the attendant terminal 3. For example, if a user who started the commodity registration process departs the work area of the checkout apparatus 2 without completing the payment process, the processor 110 transmits an alert to the attendant terminal 3. In addition, the processor 110 may transmit information such as a captured image from the surveillance camera 104 together with the alert.

It is noted that the communication IF 115 and the communication IF 116 may be one integrated communication interface for communicating with the checkout apparatus 2 and the attendant terminal 3 via a network such as a local area network (LAN).

Next, operations of the monitoring apparatus 105 according to the second embodiment will be described.

FIG. 9 is a flowchart illustrating an operation example of the user's departure detection process (person detection process) of the checkout apparatus 2 by the monitoring apparatus 105 according to the second embodiment.

Figure 4:
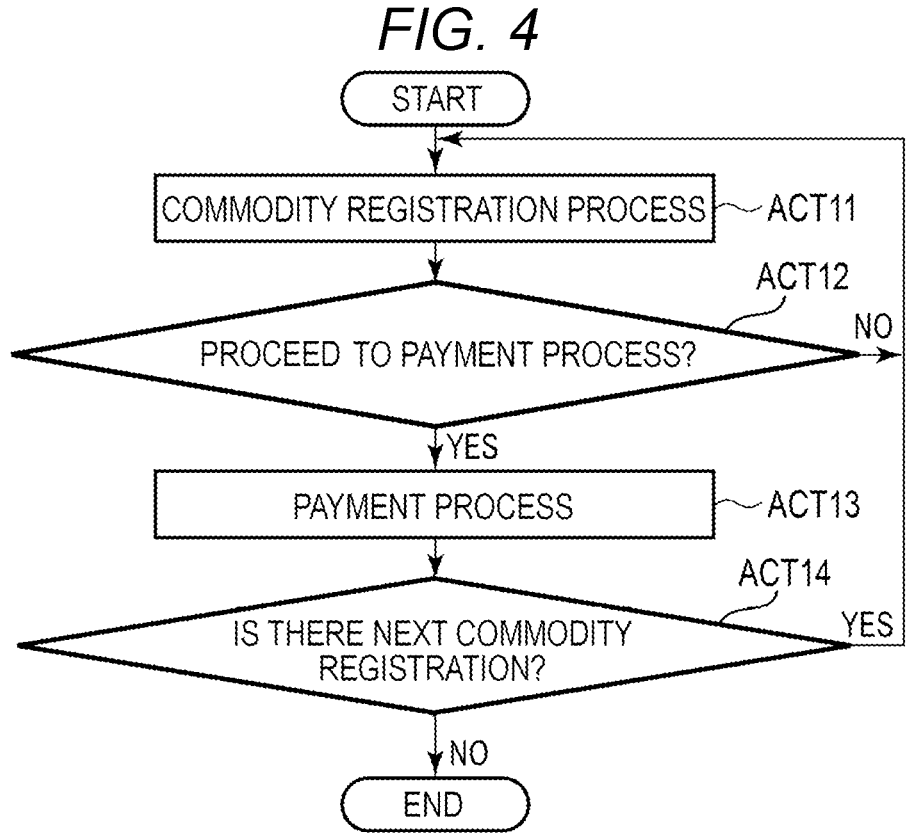
FIG. 4 is a flowchart illustrating a commodity registration process and a payment process in a checkout apparatus.

In the following description, it is assumed that the checkout apparatus 2 to be monitored by the monitoring apparatus 105 performs the commodity registration process and the payment process in manner similar to that as illustrated in FIG. 4 of the first embodiment. In addition, it is assumed that the surveillance camera 104 captures an image of an imaging range (field of view) including the work area of the checkout apparatus 2 to be monitored by the monitoring apparatus 105.

In the waiting state, the processor 110 of the monitoring apparatus 105 executes a process for detecting the start of the commodity registration process based on images acquired via the image IF 114 (ACT 31 to ACT 33). In the operation example illustrated in FIG. 9, the processor 110 acquires an image from the surveillance camera 104 for detecting the start of the commodity registration process in the checkout apparatus 2 (ACT 31).

The processor 110 executes a process for detecting the start of the commodity registration process based on the image acquired from the surveillance camera 104 (ACT 32).

For example, the processor 110 detects that the user has picked up an unregistered commodity in an image captured by the surveillance camera 104. When the processor 110 detects that the user picked up an unregistered commodity, the processor 110 then determines that the commodity registration process has started. In addition, the monitoring apparatus 105 may detect in an image captured by the surveillance camera 104 that the user performed an input operation on the display 21 of the checkout apparatus 2 to start the commodity registration process. In this case, the processor 110 determines that the commodity registration process started when the processor 110 detects that the user performed the input operation for instructing the start of the commodity registration process.

It is noted that the processor 110 may acquire a signal indicating the start of the commodity registration process from the checkout apparatus 2 via the communication IF 115. In this case, the processor 110 performs a process of determining whether or not a signal indicating the start of the commodity registration process has been acquired from the checkout apparatus 2 instead of the image acquisition and analysis of ACT 31 and ACT 32.

If the start of the commodity registration process is not detected (NO in ACT 33), the processor 110 returns to ACT 31 and repeatedly executes the above-described process.

If the start of the commodity registration process is detected (YES in ACT 33), the processor 110 acquires an image of the imaging range including the work area of the checkout apparatus 2 from the surveillance camera 104 (ACT 34). For example, the processor 110 acquires an image (video) of the imaging range including the work area to be monitored, which is captured by the surveillance camera 104 within a predetermined period.

The processor 110 checks whether or not the user is in the work area based on the images captured by the surveillance camera 104 (ACT 35). The processor 110 performs an existence check for determining whether or not the user is in the work area being monitored by analyzing images captured by the surveillance camera 104. For example, the processor 110 determines whether or not the user is in the work area by using a skeleton estimation technique such as OpenPose. In addition, the processor 110 may determine whether or not the user is in the work area by using an object detection technique such as SSD Multibox.

The processor 110 determines whether the user departed based on the result of the user existence check (ACT 36). For example, if the processor 110 detects that the user is not in the work area, the processor 110 determines that the user departed. In some examples, once the time period during which the user has not been in the work area exceeds a predetermined period, the processor 110 may determine that the user departed the work area.

If it is determined that the user departed (YES in ACT 36), the processor 110 outputs an alert (ACT 40). The processor 110 sends an alert to the attendant terminal 3 via the communication IF 116 indicating that it has been detected that an unpaying user departed. In response to the alert from the checkout apparatus 2, the attendant terminal 3 displays, on the display 70, that it has been detected that the user departed. For example, the attendant terminal 3 displays the warning screen as illustrated in FIG. 6 on the display 70. In addition, the processor 110 may send an alert notification to the checkout apparatus 2 being monitored and turn on the warning light 29 of the checkout apparatus 2.

In some examples, the processor 110 may send an alert to a mobile terminal of a staff member such as a store clerk or a security officer who can perform communication via the communication IF 115 or 116. In this case, for example, the mobile terminal, in response to the notification/alert from the monitoring apparatus 10, displays on its screen a message that it has been detected that a user departed. Accordingly, the staff member possessing the mobile terminal can be alerted the user's departure by the monitoring apparatus 105 and can visually confirm the user's behavior.

If the user does not depart (if the user is still in the work area) (NO in ACT 36), the processor 110 executes the processing for detecting the end of the payment process at the checkout apparatus 2 (ACT 37 to ACT 39). In the example illustrated in FIG. 9, the processor 110 acquires an image for detecting the end of the payment process at the checkout apparatus 2 from the surveillance camera 104 via the image IF 114 (ACT 37).

The processor 110 executes a process for detecting the end of the payment process based on the images acquired from the surveillance camera 104 (ACT 38).

For example, the processor 110 detects using at least one image captured by the surveillance camera 104 that the receipt was dispensed from the receipt issuing port 231. In this case, if the processor 110 detects that the receipt was dispensed from the receipt issuing port 231, the processor 110 determines that the payment process in the checkout apparatus 2 has been completed. In addition, the processor 110 may detect, in an image captured by the surveillance camera 104, that the user performed an input operation via the display 21 instructing to begin or end the payment process. In this case, if the processor 110 detects that the user performed an input operation and thus can determine that the payment process at the checkout apparatus 2 was ended.

It is noted that the processor 110 may acquire the information indicating the end of the payment process from the checkout apparatus 2 via the communication IF 115. In this case, the processor 110 performs a process of determining whether or not the signal indicating the end of the payment process was sent from the checkout apparatus 2 as a detection process instead of image acquisition and analysis of ACT 37 and ACT 38.

If it is not detected that the payment process is ended (NO in ACT 39), the processor 110 returns to ACT 34 and repeatedly executes the above-described process. If it is detected that the payment process is ended (YES in ACT 39), the processor 110 ends the person monitoring process for detecting the user's departure.

It is noted that the processor 110 may store the images captured by the surveillance camera 104 in the data memory 113 regardless of the presence or absence of a person inside the work area. In this case, the processor 110 records the captured images stored in the data memory 113 in association with the imaging time (e.g., a time stamp). Furthermore, the processor 110 may record the time point at which it is detected that a person is in the work area (the time point when the person enters the work area) in the data memory 113.

As described above, the monitoring apparatus 105 according to the second embodiment monitors the user's departure based on the images captured by the surveillance camera 104 from after the commodity registration process is started until the payment process is completed at the checkout apparatus 2 being monitored. The monitoring apparatus 105 can acquire video data from the surveillance camera 104 from the start of the commodity registration process until the completion of the payment process in the checkout apparatus 2. The monitoring apparatus 105 detects whether or not the user is in the predetermined work area based on the images captured by the surveillance camera 104. The monitoring apparatus 105 outputs an alert when a user who started the commodity registration process departs before the completion of the payment process.

Accordingly, the monitoring apparatus can notify others that a user who started the commodity registration process at a checkout apparatus 2 departed without the payment process being ended. In addition, the monitoring apparatus 105 can detect whether or not a person is in the work area of the checkout apparatus 2 based on the image captured by the surveillance camera 104. For this reason, the monitoring apparatus can detect the user's departure from an overhead view or the like. As a result, the monitoring apparatus can more reliably detect the user's departure even if the work area is large, unlike other person detection methods.

Furthermore, in the first and second embodiments, a case where software or programs for performing the various described functions and/or processing is recorded in the apparatus in advance has been described, but the present disclosure is not limited thereto, and the same software or programs may be downloaded from a network to the apparatus, or recorded in a non-transitory computer-readable recording medium The software and/or programs pre-installed, installed from a non-transitory computer-readable medium, downloaded, or otherwise provide may implement the various described functions in cooperation with an operating system or the like provided in the apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A checkout apparatus, comprising:
a first commodity stand on which a commodity that has not been registered for purchase is to be placed;

a second commodity stand on which a commodity that has been registered for purchase is to be placed;

a scanner between the first and second commodity stands;

a printer configured to issue a receipt;

a camera interface connectable to a camera that is positioned to image a work region in which the first and second commodity stands, the scanner, and the printer are disposed and a customer performs a registration process for registering a commodity in a sales transaction and a settlement process for completing the sales transaction, the registration process including removing the commodity from the first commodity stand, operating the scanner to read a code of the commodity, and placing the commodity on the second commodity stand; and a processor configured to:

in response to detecting an instruction to start a registration process for registering a commodity in a sales transaction, begin acquiring from the camera images of the work region at a predetermined interval, after detecting the instruction to start the registration process, in response to receiving a code of the commodity via the scanner, register the commodity using the code, based on one of the acquired images, determine whether a customer has left the work region after detecting the instruction to start the registration process and before determining that a settlement process for the sales transaction is completed, and in response to determining that the customer has left the work region at any time after detecting the instruction to start the registration process and before determining that the settlement process is completed, output an alert indicating departure of a nonpaying customer, wherein the processor is further configured to determine that the settlement process is completed when another one of the acquired images shows a receipt issued by the printer.

2. The checkout apparatus according to claim 1, further comprising:

a communication interface configured to communicate with an attendant terminal, wherein the processor controls the communication interface to output the alert to the attendant terminal.

3. The checkout apparatus according to claim 1, wherein the camera is positioned to image the checkout apparatus and its surroundings.

4. The checkout apparatus according to claim 1, further comprising:

a housing including the camera interface and the processor and disposed between the first and second commodity stands.

5. The checkout apparatus according to claim 4, further comprising:

a support column attached to the housing and extending upward from the housing, wherein the camera is mounted on the support column.

6. The checkout apparatus according to claim 1, wherein the code is represented by a barcode that is readable by the scanner.

7. The checkout apparatus according to claim 6, wherein the scanner is a hand-held type barcode scanner.

8. The checkout apparatus according to claim 1, wherein the processor is configured to obtain commodity information corresponding to the code that is read by the scanner and register the commodity using the commodity information.

9. The checkout apparatus according to claim 1, wherein the processor is configured to detect the instruction to start the registration process when a first commodity in the sales transaction is scanned by the scanner.

10. A monitoring apparatus, comprising:

a camera interface connectable to a camera that is positioned to image a work region in which first and second commodity stands, a scanner, and a printer of a checkout apparatus are disposed and a customer performs a registration process for registering a commodity in a sales transaction and a settlement process for completing the sales transaction using the checkout apparatus, wherein a commodity that has not been registered for purchase is to be placed on the first commodity stand, a commodity that has been registered for purchase is to be placed on the second commodity stand, and the registration process includes removing the commodity from the first commodity stand, operating a scanner of the checkout apparatus to read a code of the commodity, and placing the commodity on the second commodity stand; and a processor configured to:

in response to detecting an instruction to start a registration process for registering a commodity in a sales transaction, begin acquiring from the camera images of the work region at a predetermined interval, based on one of the acquired images, determine whether a customer has left the work region after detecting the instruction to start the registration process and before determining that a settlement process for the sales transaction is completed, wherein the settlement process is determined to be completed when another one of the acquired images shows a receipt issued by the printer, and in response to determining that the customer has left the work region at any time after detecting the instruction to start the registration process and before determining that the settlement process is completed, output an alert indicating departure of a nonpaying customer.

11. The monitoring apparatus according to claim 10, wherein the processor is configured to detect the completion of the settlement process based on the acquired image.

12. The monitoring apparatus according to claim 10, further comprising:

a communication interface configured to communicate with the checkout apparatus, wherein the processor is configured to detect the end of the registration process based on information received from the checkout apparatus via the communication interface.

13. The monitoring apparatus according to claim 10, further comprising:

a communication interface configured to communicate with the checkout apparatus, wherein the processor is configured to detect the instruction to start the registration process based on information received from the checkout apparatus via the communication interface.

14. The monitoring apparatus according to claim 10, further comprising:

a communication interface configured to communicate with the checkout apparatus, wherein the processor is configured to detect the instruction to start the registration process and the completion of the settlement process based on information received from the checkout apparatus via the communication interface.

15. The monitoring apparatus according to claim 10, further comprising:

a communication interface configured to communicate with the checkout apparatus and an external apparatus, wherein the alert is output via the communication interface to at least one of the checkout apparatus and the external apparatus.

16. The monitoring apparatus according to claim 15, wherein the external apparatus is a mobile terminal, and the alert is output as an email addressed to a user of the mobile terminal.

17. A method for monitoring a checkout apparatus that includes:

a first commodity stand on which a commodity that has not been registered for purchase is to be placed, a second commodity stand on which a commodity that has been registered for purchase is to be placed, a scanner between the first and second commodity stands, a printer configured to issue a receipt, a camera interface connectable to a camera that is positioned to image a work region in which the first and second commodity stands, the scanner, and the printer are disposed and a customer performs a registration process for registering a commodity in a sales transaction and a settlement process for completing the sales transaction, the registration process including removing the commodity from the first commodity stand, operating the scanner to read a code of the commodity, and then placing the commodity on the second commodity stand, the method comprising:

detecting an instruction to start a registration process for registering a commodity in a sales transaction, and beginning acquiring from the camera images of the work region at a predetermined interval;

receiving a code of the commodity via the scanner, and registering the commodity using the code; and based on one of the acquired images, determining that a customer has left the work region after detecting the instruction to start the registration process and before determining that a settlement process for the sales transaction is completed, wherein the settlement process is determined to be completed when another one of the acquired images shows a receipt issued by the printer, and in response to determining that the customer has left the work region at any time after detecting the instruction to start the registration process and before determining that the settlement process is completed, outputting an alert indicating departure of a nonpaying customer.

18. The method according to claim 17, wherein the instruction to start the registration process and the completion of the settlement process are detected based on the acquired image.

* * * * *